United States Patent [19]

Reilly, Jr.

[11] 3,757,300

[45] Sept. 4, 1973

[54] AUTOMATED NUMERIC CODE READING AND RECORDING SYSTEM

[75] Inventor: John J. Reilly, Jr., Orinda, Calif.

[73] Assignee: Binary Systems, Inc., Orinda, Calif.

[22] Filed: Nov. 15, 1971

[21] Appl. No.: 198,880

[52] U.S. Cl. 340/146.3 Z, 340/146.3 C, 340/174.1 G

[51] Int. Cl. .............................................. G06k 9/18

[58] Field of Search .............. 235/61.11 E, 61.11 D; 179/100.2 R; 340/174.1 G, 146.3 Z, 146.3 C, 146.3 A

[56] References Cited

UNITED STATES PATENTS

| | | | |
|---|---|---|---|
| 3,585,589 | 6/1971 | Reilly | 340/146.3 Z |
| 3,634,855 | 1/1972 | Miller | 340/174.1 G |
| 3,585,590 | 6/1971 | Hoffman et al. | 340/146.3 H |
| 3,652,990 | 2/1970 | Darwin | 340/146.3 C |

*Primary Examiner*—Daryl W. Cook
*Assistant Examiner*—Leo H. Boudreau
*Attorney*—Stephen S. Townsend, Donald J. Degeller and Daniel H. Kane, Jr. et al.

[57] ABSTRACT

A system for reading and recording a decimal numeric and alphabet code of the type in which each decimal digit or letter comprises four stations arranged in first and second pairs of aligned upper and lower stations with segments of different widths in selected ones of the stations. First and second sensors respectively scan the upper and lower stations of sequential characters generating separate outputs in two channels. Logic circuitry processes the outputs indicating the simultaneous occurrence or non-occurrence of segments in a pair of aligned upper and lower stations, and whether or not the upper segment is wider or not wider than any lower segment. A buffer storage stores such information about a first pair of upper and lower stations and the output from the buffer storage and the output from the logic circuitry for a second pair of aligned upper and lower stations following the first are coupled to a logic matrix to provide a binary output corresponding to the decimal digit or letter. A novel alphanumeric code or font suitable for both visual and machine reading and machine recording and coding is set forth.

7 Claims, 8 Drawing Figures

INVENTOR.
JOHN J. REILLY, JR.
BY
Townsend and Townsend
ATTORNEYS

INVENTOR
JOHN J. REILLY, JR.
BY
Townsend and Townsend
ATTORNEYS

PATENTED SEP 4 1973 3,757,300

SHEET 4 OF 5

INVENTOR.
JOHN J. REILLY, JR.

BY

Townsend and Townsend
ATTORNEYS

INVENTOR.
JOHN J. REILLY
BY
Townsend and Townsend
ATTORNEYS

AUTOMATED NUMERIC CODE READING AND RECORDING SYSTEM

This invention relates to a new and improved system for automated reading, recording, coding and decoding of a visually readable alphanumeric code, to new methods for such reading, recording, coding, and decoding, and to a novel alpha-numeric code particularly adapted for such system and methods.

The present invention contemplates using a decimal numeric and alphabet code of the type in which each decimal digit or letter is represented by line segments or other segments appropriately positioned in selected ones of four stations in the configuration of a first pair of aligned upper and lower stations and a second pair of aligned upper and lower stations parallel with the first pair. When a pair of segments occurs in a pair of aligned stations for a particular character, the segments are substantially the same width or differ by at least a predetermined width. The allocation of segments and the widths of the segments determines the alphanumeric code of the present invention as hereinafter more fully set forth, adapted for both visual reading and machine sensing. In order to facilitate visual reading, selected ones of three horizontal line segments are provided across the top of the upper stations across the bottom of the lower stations or between the upper and lower stations according to the represented decimal digit or letter. The horizontal line segments are non-functional with respect to machine sensing and do not constitute part of the code represented by the vertical segments in selected ones of the four stations comprising each character.

The decimal numeric and alphabet code can be graphically presented by contrasting ink for optical sensing or in magnetic ink for magnetic sensing. Furthermore, according to another aspect of the invention, the code can also be represented in the form of pulses recorded on magnetic tape or other magnetic media in the same format as the graphic code thereby providing a magnetic record picture of the upper and lower stations of each character.

In order to record the visually readable graphic alpha-numeric code on a magnetic medium, the present invention contemplates providing a reading or sensing head for scanning a sequence of character symbols. The reading head includes first and second sensors, the first sensor arranged to sense the presence and width of line segments or other segments in the upper stations of characters while the second sensors arrange to sense the presence and width of line segments in the lower stations of characters. The sensors and code characters are arranged so that horizontal line segments do not interfere with the sensors. Each of the sensors and its output provides a gating signal of differing duration according to the width of the sensed line segments for controlling the output of a frequency signal generator.

According to the invention, first and second gates provide two separate channels to which the output from the frequency signal generator is gated, the output signal from the first sensor being coupled to the first gate and the output signal from the second sensor being coupled to the second gate. Parallel pulse trains of the frequency signal of varying pulse duration according to the output signals from the first and second sensors are thereby fed to two channels.

Magnetic recording of the alphanumeric code is accomplished finally by a two channel magnetic recording and reading means having a pair of transducer heads for recording a pair of tracks of pulses on the magnetic record medium surface. The output from the first channel is coupled to the input of the first transducer and the output from the second channel is coupled to the input of the second transducer so that a magnetic record picture of the upper and lower stations of the sensed symbols or characters effectively results on a record medium surface during recording. Thus, a magnetic record of the decimal numeric and alphabet code comprises a pair of tracks, pulses in the upper track corresponding to segments in the upper stations of characters of the alphanumeric code and pulses in the lower track corresponding to segments in the lower stations of characters.

In order to read the magnetic record of the decimal numeric and alphabet code, the present invention contemplates simultaneously reading the pair of tracks representing the upper and lower stations of alphanumeric characters by means of the two channel magnetic recording and reading means. The parallel outputs at the first and second channels constitute pulse sequences corresponding respectively to the upper and lower stations of sequences of digits or letters recorded on the magnetic record.

The invention also contemplates providing at the output from each channel of the two channel magnetic recording and reading head a first train of pulses of the frequency signal comprising direct reading of the corresponding track on the magnetic record surface and a second train of smoothed pulses corresponding in length to and synchronized with the pulses of the frequency signal in the first train in order to facilitate logical processing and decoding in accordance with the invention.

In the preferred embodiment, the invention provides a logic matrix including three gates, a first gate and gating the first train of pulses from the upper channel, second gate for gating the first train of pulses from the lower channel and the third gate for gating the second train of smooth pulses from the upper and lower channels for providing at the output of the third gate a signal indication during the simultaneous presence of smooth pulses and lower channels. The latter output is coupled to the first and second gates to suppress the output of pulses of the first train of pulses of the frequency signal from the first and second gates during the periods when signals are simultaneously present in the upper and lower channels. Counters are provided coupled to the outputs from the first and second gates to count the cycles of the frequency signal at the output of each gate to indicate the width of the pulse and in association with additional logic circuitry to indicate that an upper station pulse from a pair of upper and lower stations is wider or not wider than any pulse occurring in the lower station and for indicating that a lower station pulse from a pair of upper and lower stations is wider or not wider than any pulse occurring in the upper station. The simultaneous occurrence of pulses in a corresponding pair of upper and lower stations is also indicated.

Further in accordance with the preferred embodiment a buffer storage is coupled for temporarily storing the information indicated by the logic circuitry for a first pair of upper and lower stations while a second set of upper and lower stations following the first set is processed. The output from the buffer storage and the logic circuits is coupled through a decoding logic matrix which provides a binary coded decimal output corresponding to the decimal digit comprising the first and second pairs of upper and lower stations.

Thus, the invention generally contemplates simultaneously sensing the presence of segments in a first pair of stations and generating a signal indicating whether or not segments occur in both stations, sensing the duration of segments in the upper and lower stations of the first pair, generating a signal indicating whether or not the upper segment is wider than the lower segment by a predetermined amount, and generating a third signal indicating whether or not the lower segment is wider than the upper segment by a predetermined amount. This data is temporarily stored during sensing and similar processing of a second pair of upper and lower stations. Finally, the data for first and second pairs of upper and lower stations corresponding to a decimal digit are logically processed to provide a binary coded decimal output corresponding to the alphanumeric code character, decimal digit or letter.

Other objects, features and advantages of the present invention will become apparent in the following specification and accompanying drawings.

FIG. 1 graphically depicts the decimal numeric font of the alphanumeric code in accordance with the present invention.

Figure 7:
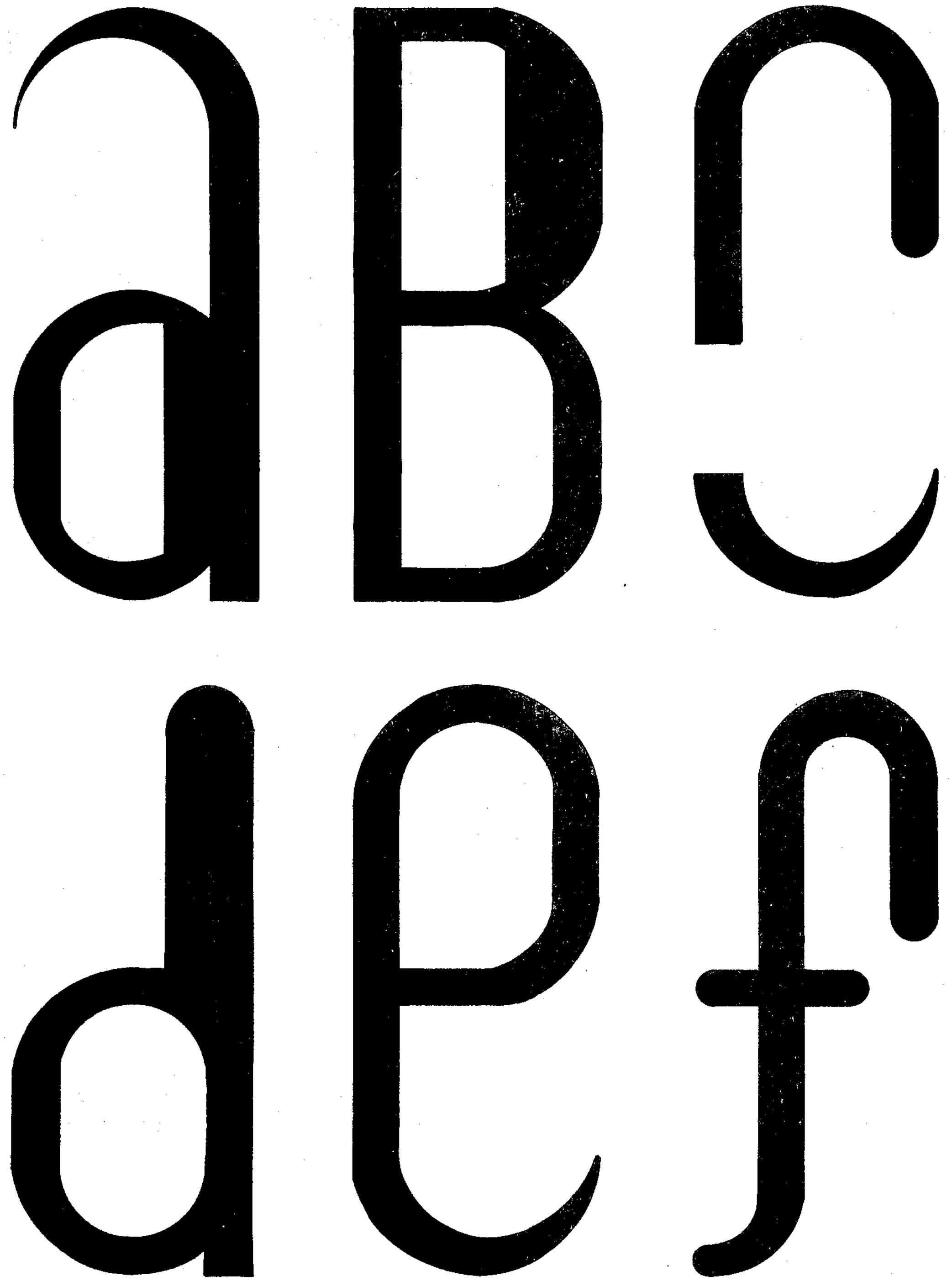

FIG. 7 graphically depicts alphabet letters of the alphanumeric code in accordance with the present invention.

Figure 1:
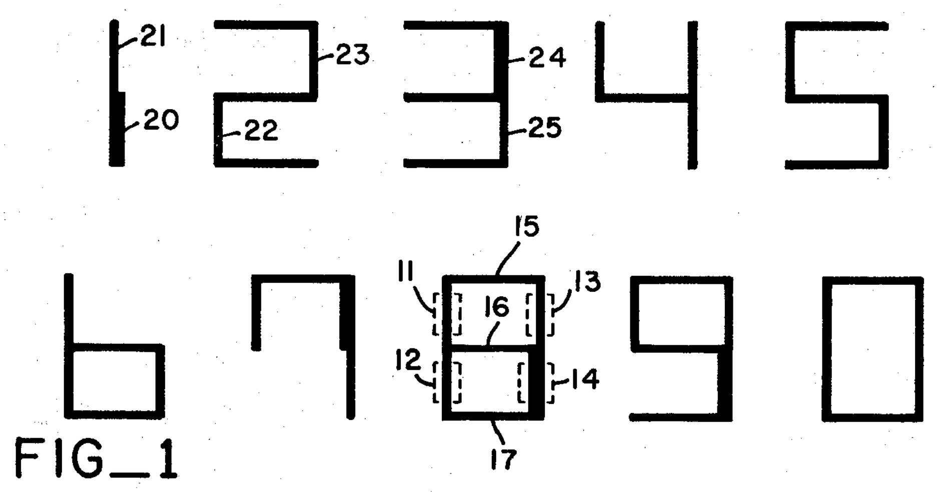

The decimal digits of the alphanumeric code of the present invention is illustrated in FIG. 1 and the invention is first described with reference to these decimal digits. Each of the digits of the code can be visualized as represented by line segments appropriately positioned in selected ones of four stations. With particular reference to the digit 8, the four stations are arranged in the configuration of a first pair of aligned upper and lower stations 11 and 12 and a second pair of aligned upper and lower stations 13 and 14 parallel with the first pair. The vertical line segments which graphically represent the digit occur in selected ones of the four stations according to the digit being represented. For a pair of segments occurring in both stations of a pair of aligned upper and lower stations as is the case in both of the pairs of stations in the digit 8, the segments are either substantially the same width of differ by at least a predetermined width. Thus, with reference to FIG. 8, the line segments in the aligned pair of upper and lower stations 11 and 12 are substantially the same width while with respect to the aligned pair of stations 13 and 14, the line segment in station 14 is wider by a predetermined amount than the line element in station 13. It is the selected line elements in these four stations that are relevant during machine reading or sensing as hereinafter described. To facilitate visual reading, however, horizontal line elements can also be provided as for example, line elements 15, 16 and 17 with reference to digit 8.

The decimal digit 1 is formed by line elements or segments in only one pair of aligned upper and lower stations, the segment 20 in the lower station being wider than the segment 21 in the upper station. The decimal digit 2 includes a single line element or segment 22 in the lower station of a first pair of aligned upper and lower stations and a second segment 23 in the upper station of a second pair of aligned upper and lower stations. The decimal digit 3, as with digit 1, is formed by segments in a single pair of aligned upper and lower stations. The segment 24 in the upper station, however, being wider than the segment 25 in the lower station by a predetermined amount.

The digit 4 includes a segment in the upper station of a first pair of aligned upper and lower stations and line segments or elements of substantially the same width in both the upper and lower stations of a second pair of stations. The digit 5 is essentially the obverse of the digit 2 and is formed with a segment in the upper station of a first pair of aligned upper and lower stations and a segment in the lower station of a second pair of aligned upper and lower stations. The digit 6 comprises segments of substantially the same width in the first pair of aligned upper and lower stations and a segment in the lower station of the second pair of aligned upper and lower stations.

The digit 7 is formed with the segment in the upper station of a first pair of aligned upper and lower stations and segments in the upper and lower stations of a second pair, the segment of the upper station being wider by a predetermined amount than that of the lower station. The digit 9 comprises a line segment in the upper station of a first pair of aligned stations and line segments in a second pair of aligned upper and lower stations, the line segment in the lower station being wider than the line segment of the upper station by the predetermined amount. Finally the digit zero comprises line segments of substantially the same width in all the stations of two pairs of adjacent aligned upper and lower stations.

In each of the digits of the decimal numeric code described above, horizontal line segments are appropriately placed to make the digits readily recognizable and visually readable according to traditional decimal notation appearance. Thus, horizontal line segments are appropriately placed above the upper stations of two adjacent pairs of stations, below the lower stations of two adjacent pairs of stations or between the upper and lower stations as required.

In normal use the decimal numeric code can be graphically represented by contrasting ink for optical sensing or it can also be printed in magnetic ink for magnetic sensing.

Figure 2:
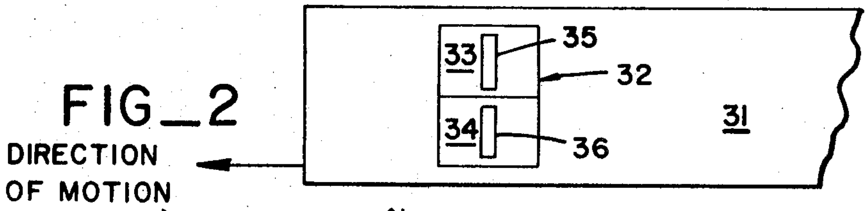
FIG. 2 is a diagrammatic plan view of the mask for optically sensing the upper and lower stations of a sequence of the decimal numeric code digits or code letters without interference by horizontal line segments.
Figure 3:
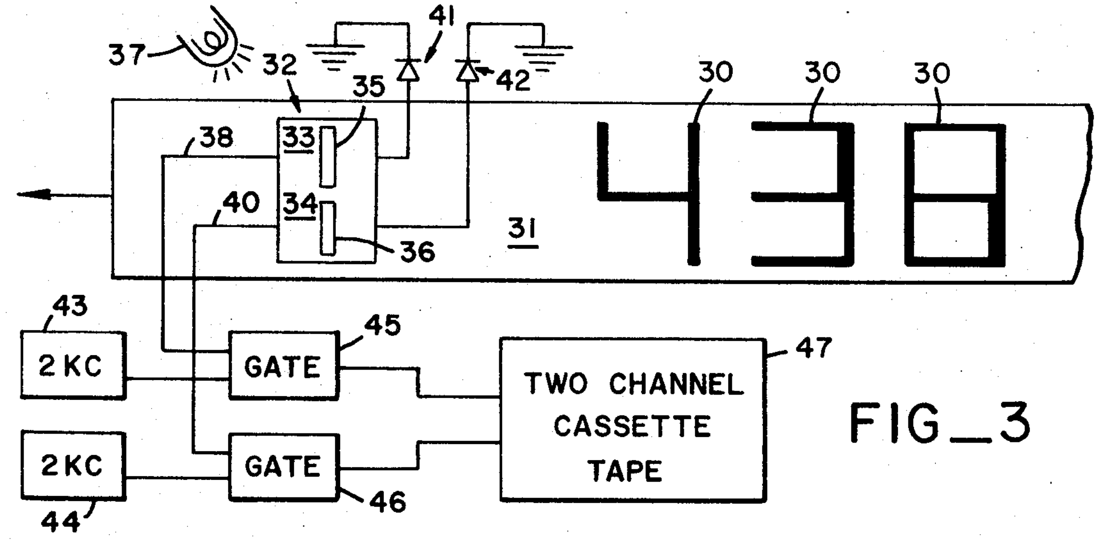
FIG. 3 is a diagrammatic view of the system for magnetically recording the graphically presented alphanumeric code.

Sensing and recording of the graphically presented decimal numeric code on, for example, a magnetic record is illustrated with reference to FIGS. 2 and 3. As shown therein, the sequence of digits 30 of the decimal numeric code on a carrier 31 are transported relative to a scanning head 32 constructed and arranged to form a mask of upper and lower sensors. Thus, the scanning head 32 includes an upper mask portion 33 and a lower mask portion 34. A window 35 is formed in the upper mask portion isolated from a window 36 formed in the lower mask portion. The pair of windows 35 and 36 is set within the boundaries of the mask and within the upper and lower limits of the digits to coincide with the upper and lower stations comprising each digit and to exclude any horizontal line segments from the windows. Each window is provided with a photo sensitive material such as a photo conductive material so that with a light source 37 projecting through the carrier from the other side, the photo conductive material and windows 35 and 36 are normally conducting providing routes along lines 38 and 40, respectively, through diodes 41 and 42, respectively, to ground. During recording, a frequency signal generator provides 2kc signal sources 43 and 44 to gates 45 and 46, respectively. The signals are bypassed to ground during the times that windows 35 and 36 are conducting. However, when vertical line elements or segments from digits 30 pass beneath the windows 35 and 36, blocking the light, gates 45 and 46 then pass the respective signals corresponding to segments in upper and lower stations respectively to a two channel cassette magnetic tape recorder 47. The two channel magnetic tape recording unit is provided with a magnetic recording and reading head having a pair of magnetic transducers to one of which is coupled the output from gate 45 and to the other of which is coupled the output from gate 46. The decimal numeric code is therefore recorded on the magnetic record medium in the form of a pair of parallel tracks, each track consisting of a train of pulses of the 2kc frequency signal, each pulse corresponding to the presence of a segment and the width of each pulse corresponding to the width of the segment. As a result, the numeric decimal code is recorded on the magnetic record medium in a format directly corresponding to the graphic representation except in the form of magnetic pulses no longer visually readable. Apparatus and circuitry for recording the decimal numeric code is set forth in copending U.S. Pat. application Ser. No. 145,983, filed by the present applicant on May 21, 1971.

Figure 4:
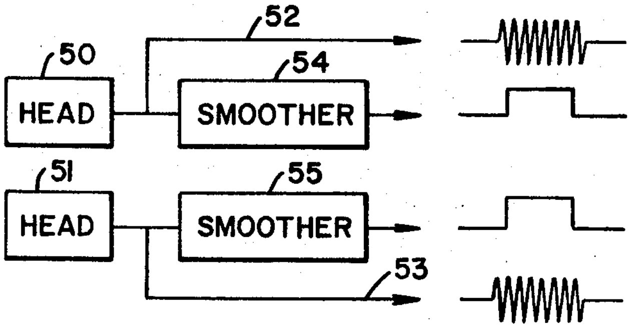
FIG. 4 is a fragmentary diagrammatic view of the portion of the system for reading the magnetic record of the alphanumeric code and generating a pair of signals for each channel, a first train of pulses of the frequency signal and a second train of smooth pulses corresponding in width to and synchronized with the pulses of the frequency signal of the first train.
Figure 5:
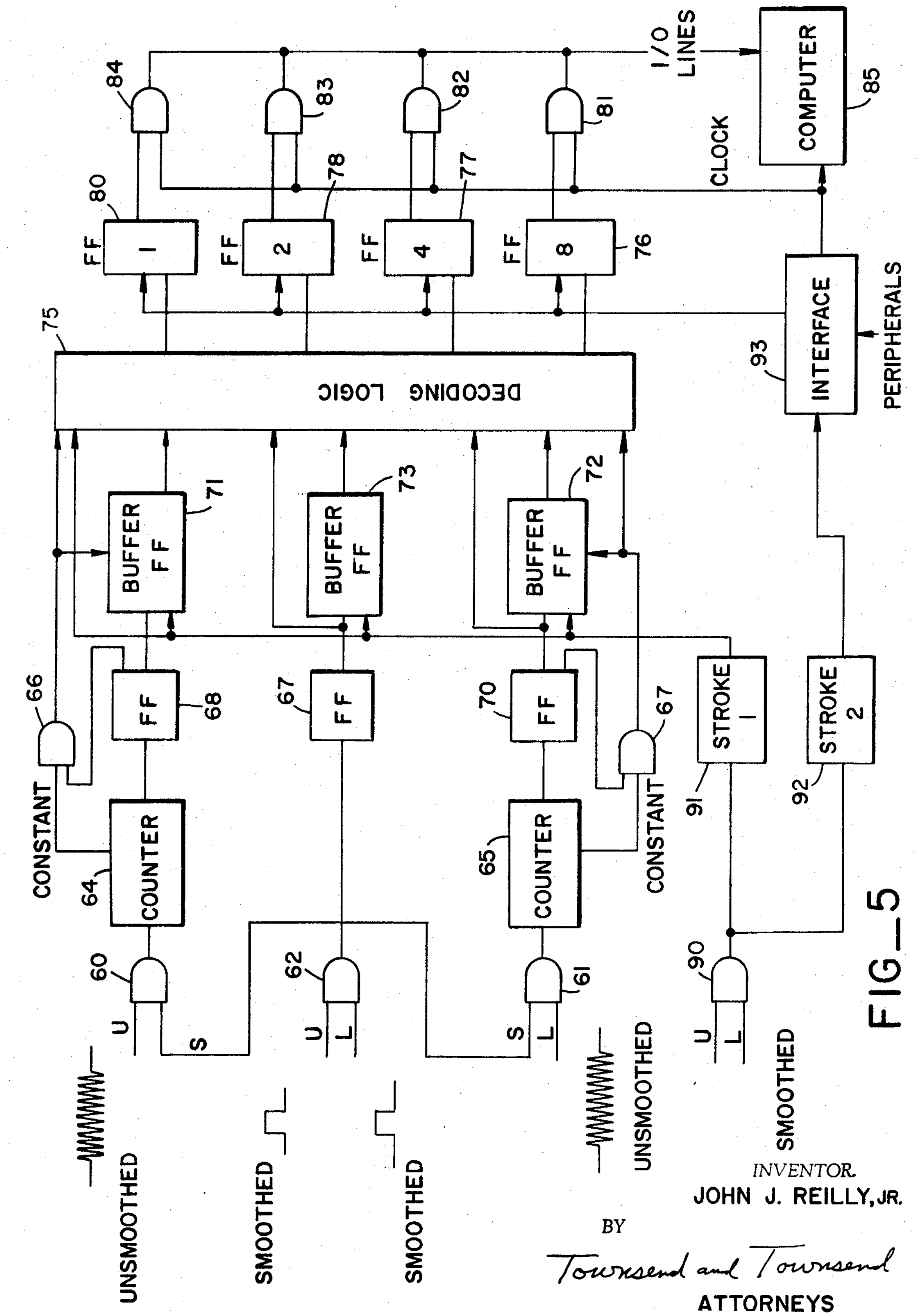
FIG. 5 is a block diagrammatic view of the magnetic reading and decoding system.

The automated reading and decoding of the magnetic record of the decimal numeric code, is illustrated with reference to FIGS. 4–6. The two channel recording and reading head of the two channel cassette tape described with reference to FIG. 3 is shown diagrammatically in FIG. 4. A pair of heads or sensors 50 and 51 read the parallel tracks of sequential digits of the numeric code, corresponding to the upper and lower channels and containing the information about the upper and lower stations, respectively. Two outputs are derived from each of the sensors 50 and 51 for the purpose of processing the signals in accordance with the unique decoding arrangement of the present invention. Thus, line 52 from sensing head 50 and line 53 from sensing head 51 provide a first output in the form of a direct reading of the tracks in each channel, each track containing trains of pulses of the frequency signal having pulse positions and widths corresponding to segments in upper and lower stations, respectively, of the encoded sequential decimal digits. A second output line from sensing head 50 is coupled through a smoother or filter 54 while a second output from the sensing head 51 is coupled through a smoother or filter 55 in order to provide a second output from each head consisting of a train of smoothed pulses of generally square wave form having positions and durations coinciding with the pulses in the first output from each head on lines 52 and 53. Thus, both an unsmoothed and a smoothed pulse train is provided at the output from each sensing head of the two channel magnetic recording and reading head.

Processing of the outputs from the two channel magnetic tape cassette during the reading mode is described with reference to FIGS. 5 and 6. FIG. 5 is a generalized block diagram of the signal processing and decoding system in accordance with the present invention while FIG. 6 is a detailed schematic diagram of one example of processing and decoding logic circuitry for implementing the system. Corresponding reference numbers on FIGS. 5 and 6 show the portions of the circuitry of FIG. 6 corresponding to the components of the diagram of FIG. 5.

The direct read-out of the train of unsmoothed pulses of the frequency signal in the upper channel, U, is coupled to the input of a logic gate 60 while the direct read-out of the train of unsmoothed pulses of the frequency signal in the lower channel, L, is coupled to the input of gate 61. At the same time, the second output from each channel consisting of the train of smoothed pulses is coupled to the input of logic gate 62 which is arranged to provide an inhibiting or suppressing signal, S, at its output during the periods of coincidence of smoothed pulses from the upper and lower channels at its input. Thus, a gating or suppressing signal S is provided at the output of gate 62 during the coincidence of smoothed pulses at its input and only during the duration of coincidence of the "one" level potential of the pulses. The output from gate 62 is coupled to a second input at each of the gates 60 and 61 in order to suppress the propagation of the first output of unsmoothed pulses in the upper and lower channels whenever the suppressing signal S is present at the input to gates 60 and 61.

The outputs from gates 60 and 61 are coupled respectively to counters 64 and 65, each consisting of a sequence of flip-flops. Each of the counters 64 and 65 counts the periods of the frequency signal in a pulse received from the gates 60 and 61, respectively, to provide data as to the width of the pulse for further processing.

It is apparent that each of the counters 64 and 65 counts the periods of a pulse of the frequency signal in either of two situations. First, when a pulse is present in only one of the two channels, either the upper or lower channel, no suppressing signal is generated by gate 62 and the pulse of the frequency signal passes to the appropriate counter for processing. Second, when even though a pulse occurs in both of the channels, one of the pulses is of longer duration than the other, the suppressing signal is present for the duration of pulse coincidence but is not present during the time of excess duration of one pulse over the other. One of the counters therefore counts the periods of the frequency signal of the wider pulse but only for that width of the pulse in excess of the shorter pulse. In order to provide an indication that one of the coincidence pulses in the upper and lower channel is wider or longer than the other pulse by a predetermined amount, each of the counters 64 and 65 is tapped at a predetermined point through gates 66 and 67, respectively.

The flip-flop 67 coupled to the output of gate 62 provides at its outputs an indication that pulses have occurred simultaneously or not in both the upper and lower channel. Flip-flop 68 is coupled to the output of the counter 64 to indicate a pulse occurring alone in the upper channel while flip-flop 70 is coupled to the output of counter 65 to indicate the occurrence of a pulse alone in the lower channel.

The output from flip-flop 68 and the constant tap from counter 64 are both coupled through a gate 66 which provides an output indication whenever a pulse occurs alone in the upper channel or if simultaneous pulses occur in both the upper and lower channel whenever the pulse in the upper channel exceeds in width the pulse in the lower channel by a predetermined amount. The output from gate 66 is coupled to buffer flip-flop 71 which therefore stores the data indication that any pulse occurring in the upper channel is wider or not wider than any pulse occurring in the lower channel.

The output from flip-flop 70 and the constant tap from counter 65 are coupled to gate 67 which provides an output indication whenever a pulse occurs alone in the lower channel or if simultaneous pulses occur in both the upper and lower channel whenever the pulse in the lower channel is wider than the pulse in the upper channel by a predetermined amount. The output from gate 67 is coupled to buffer flip-flop 72 which therefore temporarily stores the data indication that any pulse occurring in the lower channel is wider or not wider than any pulse occurring in the upper channel.

The output indication from flip-flop 67 indicating whether or not in fact pulses are occurring simultaneously in the upper and lower channel is fed to buffer flip-flop 73 for temporary storage. Buffer flip-flops 71, 72 and 73 therefore temporarily store the above described data for an aligned pair of upper and lower stations of a decimal digit of the decimal numeric code. By this expedient, the pulses corresponding to a second aligned pair of upper and lower stations following the first can be processed by the input gates, counters and flip-flops to provide the same data so that the data or information with respect to the four stations of a decimal digit of the decimal numeric code consisting of two pairs of the lined upper and lower stations can simultaneously be processed for decoding by the decoding logic matrix 75. Thus, after the pulses or non-pulses from the upper and lower channel corresponding to a second pair of aligned upper and lower stations has been processed, this output and the previous output from buffer flip-flops 71, 72 and 73 are coupled into the decoding logic matrix 75 whose unique logic circuitry provides a binary coded decimal output temporarily stored in flip-flops 76, 77, 78 and 80 corresponding to an 8421 binary coded decimal output. These output signals can be clocked through gates 81, 82, 83 and 84 through input-output lines to, for example, a computer 85 for further processing.

Turning to the timing signals for the reading and decoding circuitry, the timing signals are provided by the smoothed pulses in the upper and lower channel which are also fed to gate 90 which actuates flip-flop 91 to provide a first clock signal and flip-flop 92 to provide a second clock signal. At stroke 1 the flip-flops 67, 68 and 70 are reset and the information about pulses corresponding to a first pair of aligned stations in the upper and lower channels are gated into the buffer flip-flop 71, 72 and 73 for temporary storage. At stroke 2, corresponding to the processing of pulses corresponding to a second pair of aligned upper and lower stations in the upper and lower channels following the first pair, the data from the reading logic and buffer flip-flops are fed through the decoding matrix 75 and gated into the BCD output flip-flops 76, 77, 78 and 80. Output of the numeric code digit data is mediated by the interface 93 for computer 85.

Figure 6A:
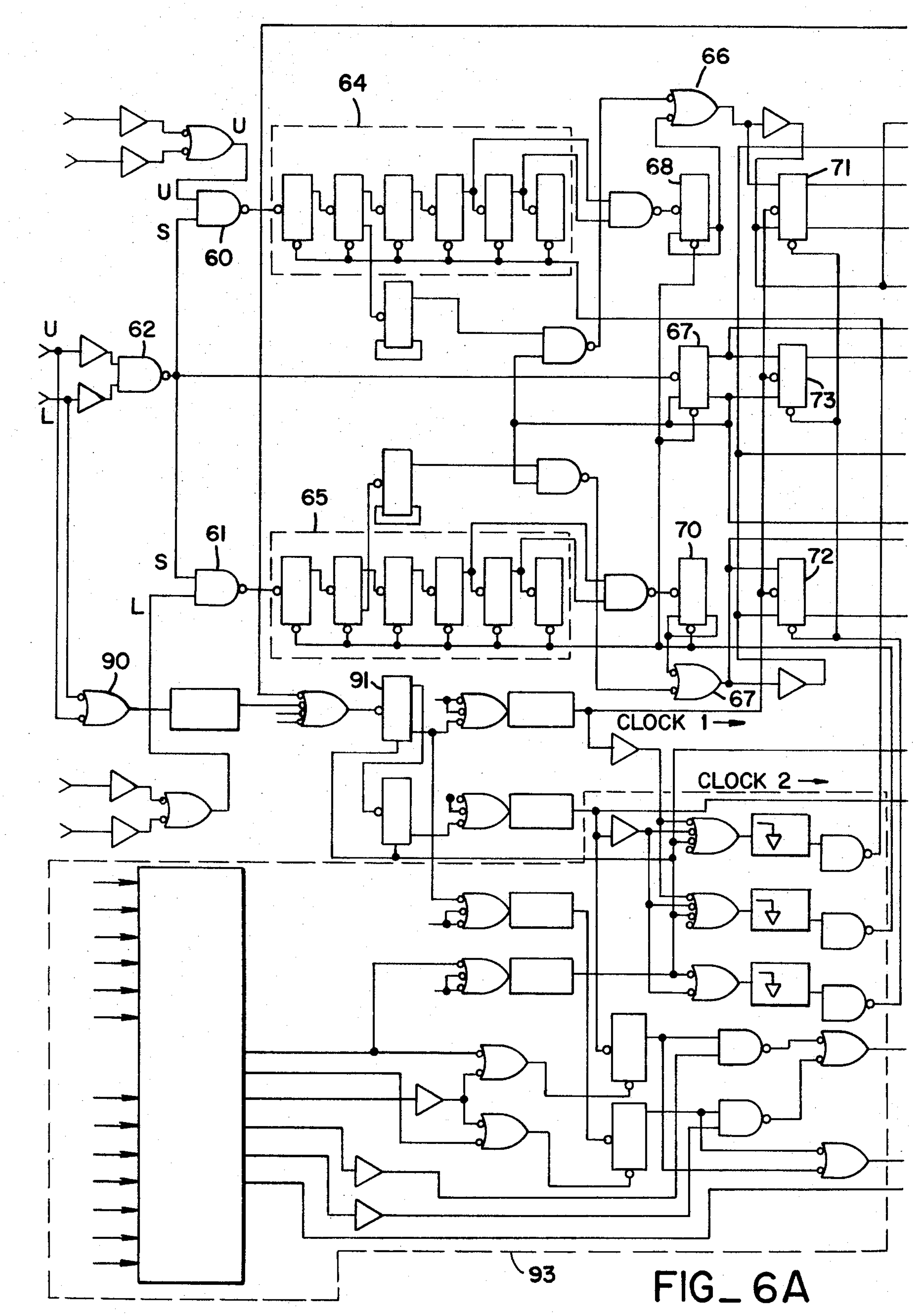
FIG. 6 is a detailed schematic diagram of one example of alphanumeric code magnetic reading and decoding logic circuitry.
Figure 6B:
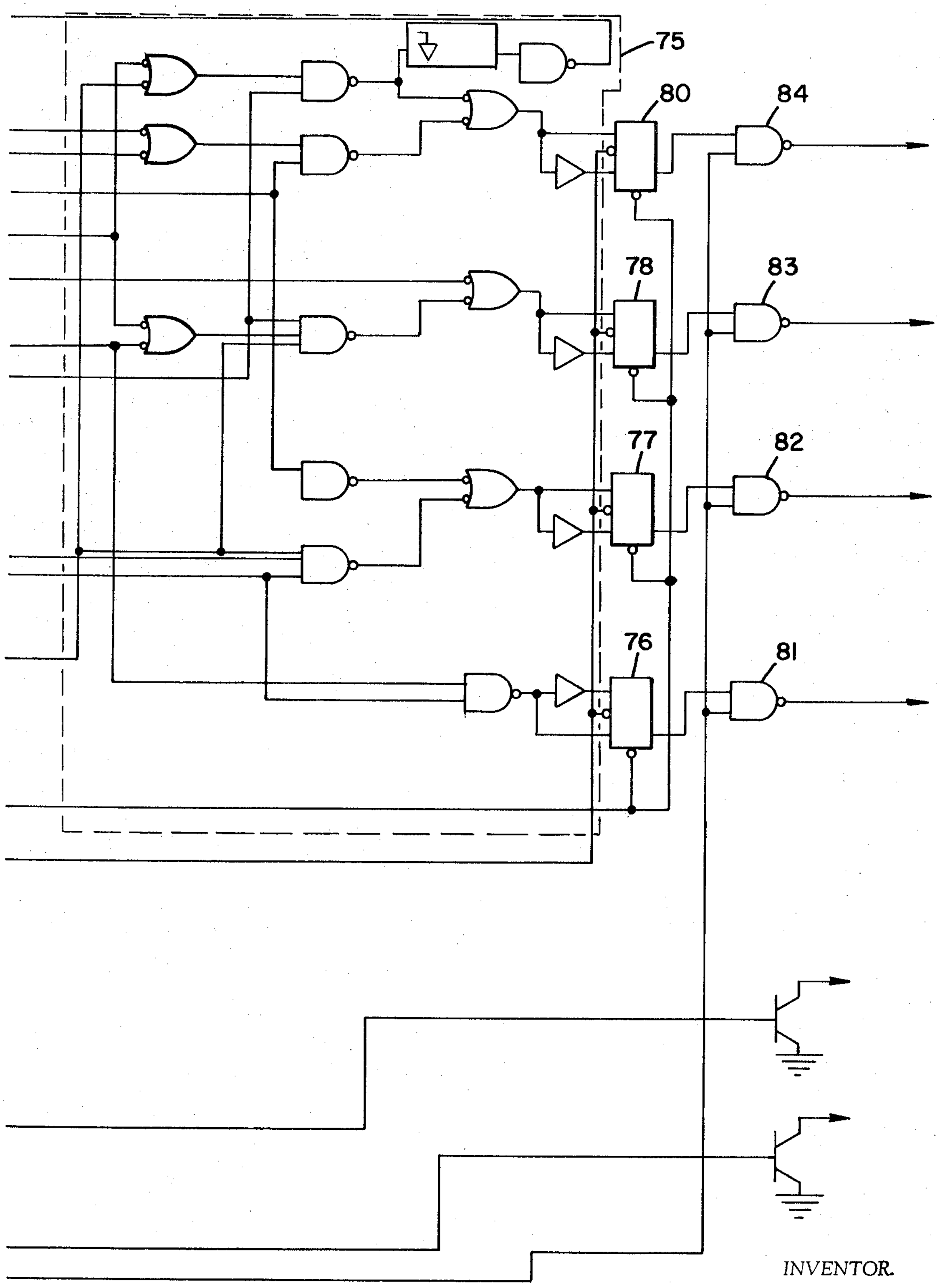

The decoding matrix 75 shown in detail in FIG. 6 embodies the logic equations for generating a BCD output from the decimal numeric code input as read out in the form of pulses in two channels from the magnetic tape. As heretofore described each digit represents pulses from two pairs or sets of aligned stations. The equations for providing a BCD output from these pulses are set forth as follows with reference to a notation system in which C denotes a pulse in the upper station while D denotes a pulse in the lower station, subscript 1 denoting the first pair of stations and indicating occurrence of the pulse in the first pair of stations and subscript 2 denoting the second pair of stations comprising the digits. The coincidence of C and D namely CD indicates the simultaneous occurrence of segments in the upper and lower channels while $\overline{CD}$ indicates non-coincidence of pulses in a pair of aligned stations in the upper and lower channels. The symbol $>$ and the symbol $\overline{>}$ indicate that the preceding segment is wider or not wider than the segment in the other station of aligned pair of stations.

An output at the one's position of the BCD output namely an output at flip-flop 80 occurs under each of the following conditions:

$$C_1> \cdot C_1D_1$$

$$D_1> \cdot C_1D_1$$

$$C_1> \cdot C_2>C_1> \cdot D_2>$$

an output is provided at the two's position namely flip-flop 78 under each of the following conditions:

$$C_2>$$

$$\overline{D_1}> \cdot C_1D_1 \cdot C_1>$$

$$\overline{D_1}> \cdot C_1D_1 \cdot \overline{C_2D_2}$$

an output is provided at the four's position namely flip-flop 77 under each of the following conditions:

$$C_2D_2 \cdot C_1> \cdot \overline{D_2}>$$

$$D_2> \cdot \overline{D_1}> \cdot \overline{C_2D_2}$$

and an output is provided for the eight's position namely flip-flop 76 under the following conditions:

$$D_2> \cdot C_2D_2$$

no output is provided indicating a zero under the following conditions:

$$\overline{C_1}> \cdot \overline{D_1}> \cdot C_1D_1 \cdot C_2D_2 \cdot \overline{D_2}>$$

Examples of alphabet letters of the alphanumeric code of the present invention are illustrated in FIG. 7. In the same manner as the decimal digits of the code decribed above, each of the letters used in the code can be visualized as represented by line segments appropriately positioned in selected ones of the four stations heretofore described. Similarly, when line segments are present in a pair of upper and lower stations they can be of the same width or may differ in width by a predetermined amount. As illustrated in FIG. 7 six possible alphabet letters have been selected and depicted utilizing six of the remaining possible permutations of the four position code not already used by the decimal numeric digits heretofore described. These letters are magnetically recorded, sensed and decoded in the same manner and using the same system heretofore described with reference to the decimal digit.

With particular reference to the small letter *d* illustrated in FIG. 7 that character is represented by a first pair of upper and lower stations in which no line segment is present in the first upper station with a line segment present in the lower station, and by a second aligned pair of upper and lower stations in which segments are present in both the second upper and lower stations but with the line segment in the second lower station wider by a predetermined amount than that in the second upper station. Each of the other letters depicted can be similarly characterized in a manner to distinguish it in the four position code from each of the other letters and each of the decimal digits of the code heretofore described. In reading and decoding alphabet letter characters using a reader and decoder of the type described with reference to FIGS. 5 and 6, each letter is represented by a four position binary digit output from the reader and decoder in the same manner as the decimal digits. Each of the letters is represented by an unused combination of the BCD code not already assigned to one of the small digits. Thus the small letter *d* is represented by the BCD output 1101; the "B" appears at the output in the BCD representation 1011; "C" as 1100; small *a* as 1010; small *e* as 1110; and small *f* as 1111. It is apparent that other letters can be selected and depicted according to various graphic representations in utilizing the remaining BCD permutations not allocated to the decimal numeric digits.

What is claimed is:

1. Apparatus for automated reading and recording of a visually readable alphanumeric code of the type comprising decimal digit and letter characters each character represented by line segments appropriately positioned in selected ones of four stations in the configuration of a first aligned pair of upper and lower stations and a second pair of aligned upper and lower stations parallel with said first pair, each aligned pair of segments occurring in a pair of stations being substantially the same width or differing by at least a predetermined width and wherein selected ones of three horizontal line segments may be provided across the top of the upper stations, across the bottom of the lower stations, or between the upper and lower stations according to the represented character, said character arranged sequentially on a carrier for both visual reading and machine sensing, said apparatus comprising:

a sensing head for scanning said alphanumeric code characters comprising first and second sensors, said first sensor arranged to sense the presence and width of line segments in the upper stations of characters without interference by any horizontal line segments and said second sensor arranged to sense the presence and width of line segments in the lower stations of characters without interference by any horizontal line segments, said first and second sensors providing gating signals of differing duration according to the width of sensed line segments;

signal frequency generator means for generating an output signal of predetermined frequency;

first and second gating means providing two separate channels to which the output from said signal frequency generator is gated, the output signal from said first sensor coupled to the first gating means and the output signal from said second sensor coupled to the second gating means for gating into the two channels parallel pulses of said frequency signal of varying pulse duration according to the output signals from said first and second sensors;

and a two-channel magnetic recording and reading means having a pair of transducer heads for recording a pair of tracks of pulses on a magnetic record medium surface, the output from said first gating means coupled to the input of said first transducer and the output from said second gating means coupled to the input of said second transducer, whereby there is provided during recording on the record medium surface a magnetic record picture of the upper and lower stations of the sensed characters; and wherein the output of each transducer of the magnetic recording and reading means is coupled to provide during reading, two outputs, a first signal output comprising a train of pulses of the frequency signal read directly from the magnetic recording surface and a second signal output coupled through filter means to provide a train of smoothed pulses having durations equal to the durations of the pulses of the frequency signal in the first signal output.

2. Apparatus for automated reading and recording of a visually readable alphanumeric code as set forth in claim 1, wherein is also provided:

first gating means for gating the upper station first signal output pulses of the frequency signal, second gating means for gating the lower station first signal output pulses of the frequency signal, and third gating means for gating the upper and lower stations second signal output filtered pulses for providing at the output of the third gating means signal indication during the simultaneous presence of filtered pulses in the upper and lower channels, the output from said third gating means also coupled to the first and second gating means to suppress the output of first signal pulses of the frequency signal from the first and second gates during the periods when signals are simultaneously present in upper and lower stations;

first and second counter means coupled to the outputs from said first and second gating means, respectively, to count the cycles of the frequency signal at the output of each said first and second gating means to indicate the width of a pulse;

first logic circuit means coupled to the output of said first counter for indicating that an upper station pulse from a pair of upper and lower stations is wider than any pulse occurring in the lower station, second circuit means coupled to the ouput from said second counter means for indicating that a lower station from said pair of upper and lower stations is wider than any pulse occurring in the upper station, and third logic circuit means for indicating the simultaneous one of the combination of an occurrence of pulses in a corresponding pair of upper and lower stations and non-coincidence of pulses in said upper and lower stations;

buffer storage means coupled to the output from said logic circuit means for temporarily storing the information from said logic circuit means for a first pair of upper and lower stations whereby said logic circuit means can provide information for a second set of upper and lower stations following the first set, said four stations of the first and second set comprising a character of the alphanumeric code;

and decoding logic matrix means coupled for receiving information from said logic circuit means and buffer storage means for providing a binary coded decimal output corresponding to the character.

3. Apparatus for reading and coding a decimal numeric and alphabet character code recorded on a magnetic record surface, each character comprising pulses of a frequency signal at selected ones of four stations arranged in the configuration of a first pair of aligned upper and lower stations and a second pair of aligned upper and lower stations whereby a sequence of characters is recorded on the magnetic record surface in the form of a pair of parallel tracks, one track recording all pulses in upper stations of characters and the other track recording all pulses in lower stations of characters, said apparatus comprising:

two-channel magnetic reading means for simultaneously reading said upper and lower stations comprising the first and second tracks and providing in parallel sequence at the outputs of upper and lower channels, pulse sequences respectively from the upper and lower stations corresponding to sequences of characters recorded on the magnetic record surface;

means for providing from the output of each channel a first train of frequency signal pulses comprising a direct reading of the magnetic record surface and a second train of smoothed pulses corresponding to and synchronized with the frequency signal pulses of the first train;

first gating means for gating the upper channel first train of pulses of the frequency signal, second gating means for gating the lower channel first train of pulses of the frequency signal, and third gating means for gating the upper and lower channel second trains of smoothed pulses for providing at the output of the third gating means signal indication during the simultaneous presence of smoothed pulses in the upper and lower channels, the output from said third gating means also coupled to the first and second gating means to suppress the output of pulses of the frequency signal from the first and second gates during the periods when signals are simultaneously present in the upper and lower channels from corresponding upper and lower stations;

first and second counter means coupled to the outputs from said first and second gating means respectively to count the cycles of the frequency signal at output of each gating means to indicate the width of a pulse;

first circuit means coupled to the output of said first counter for indicating that an upper station pulse from a pair of upper and lower stations is wider than any pulse occurring in the lower station, second circuit means coupled to the output of said second counter means for indicating that a lower station pulse from said pair of upper and lower stations is wider than any pulse occurring in the upper station, and third circuit means for indicating the simultaneous one of the combination of an occurrence of pulses in a corresponding pair of upper and lower stations and non-coincidence of pulses in said upper and lower stations;

buffer storage means coupled for temporarily storing the information from said indicating means for a first pair of upper and lower stations whereby said indicating means can provide information as to a second set of upper and lower stations following the first set, said four stations of the first and second set comprising a character of the code;

and decoding logic matrix means coupled for receiving the information from said indicating means and buffer storage means for providing a binary coded decimal output corresponding to the character.

4. A system for reading an alphanumeric code as set forth in claim 3, wherein said coding logic matrix provides binary coded decimal signals and comprises at least four gates corresponding to the ones, twos, fours, and eights position of the binary code, and wherein said coding logic matrix is constructed and arranged to provide an output at the ones position under each of the following conditions where C and D refer to segments in upper and lower stations respectively, subscript 1 denoting the first pair and subscript 2 denoting the second pair wherein CD and $\overline{CD}$ indicate respectively, simultaneous occurrence and non-occurrence of segments, and wherein > and $\overline{>}$ indicate that the preceding segment is wider and not wider;

$$C_1> \cdot C_1D_1$$

$$D_1> \cdot C_1D_1$$

$$C_1> \cdot C_2>$$

$$C_1> \cdot D_2>$$

and wherein an output is provided at the two's position under each of the following conditions:

$$C_2>$$

$$\overline{D_1}> \cdot C_1D_1 \cdot C_1>$$

$$\overline{D_1}> \cdot C_1D_1 \cdot \overline{C_2D_2}$$

and wherein an output is provided at the four's position under each of the following conditions:

$$C_2D_2 \cdot C_1> \cdot \overline{D_2}>$$

$$D_2> \cdot \overline{D_1}> \cdot \overline{C_2D_2}$$

and wherein an output is provided for the eight's position under the following conditions:

$$D_2> \cdot C_2D_2$$

and wherein no output is provided indicating a zero under the following conditions:

$$\overline{C_1}> \cdot \overline{D_1}> \cdot C_1D_1 \cdot C_2D_2 \cdot \overline{D_2}>$$

5. A system for reading a decimal numeric and alphabet code of the type in which each character comprises four stations with segments of different widths in selected ones of said stations, said characters arranged with a first pair of aligned upper and lower stations and a second aligned pair of upper and lower stations adjacent the first pair comprising:

a reading head comprising first and second sensing means for scanning sequential characters of the alphanumeric code, the first sensing means arranged to sense segments in the upper stations and said second sensing means arranged to sense segments in the lower stations;

first logic circuit means coupled to said reading head for indicating the simultaneous one of the combination of an occurrence and non-occurrence of segments in a pair of aligned upper and lower stations;

second logic circuit means coupled to the reading head for indicating that the upper segment is one of the combination of being wider and not wider than any lower segment in the aligned pair of upper and lower stations;

third logic circuit means coupled to the reading head for indicating that the lower segment is one of the combination of being wider and not wider than any upper segment in said aligned pair of upper and lower stations;

buffer storage means coupled for storing information about a first pair of upper and lower stations derived from said first, second and third logic circuit means whereby similar information can be provided by said first, second and third logic circuit means for a second pair of upper and lower stations following the first pair, said first and second pairs of upper and lower stations comprising a character of the code;

coding logic matrix means coupled for processing the information derived from said first, second and third logic circuit means and said buffer storage means to provide a binary output corresponding to the code character; wherein said coding logic matrix means provides binary coded decimal signals and comprises at least four gates corresponding to the ones, twos, fours, and eights position of the binary code, and wherein said coding logic matrix is constructed and arranged to provide an output at the ones position under each of the following conditions where C and D refer to the segments in upper and lower stations respectively, subscript 1 denoting the first pair and subscript 2 denoting the second pair and wherein CD and $\overline{CD}$ indicate respectively, simultaneous occurrence and non-occurrence of segments, and wherein $>$ and $\overline{>}$ indicate that the preceding segment is wider or not wider;

$$C_1> \cdot C_1D_1$$

$$D_1> \cdot C_1D_1$$

$$C_1> \cdot C_2>$$

$$C_1> \cdot D_2>$$

and wherein an output is provided at the two's position under each of the following conditions:

$$C_2>$$

$$\overline{D_1}> \cdot C_1D_1 \cdot C_1>$$

$$\overline{D_1}> \cdot C_1D_1 \cdot \overline{C_2D_2}$$

and wherein an output is provided at the four's position under each of the following conditions:

$$C_2D_2 \cdot C_1> \cdot \overline{D_2}>$$

$$D_2> \cdot \overline{D_1}> \cdot \overline{C_2D_2}$$

and wherein an output is provided for the eight's position under the following conditions:

$$D_2> \cdot C_2D_2$$

and wherein no output is provided indicating a zero under the following conditions:

$$\overline{C_1}> \cdot \overline{D_1}> \cdot C_1D_1 \cdot C_2D_2 \cdot \overline{D_2}>$$

6. A method for reading and coding a decimal digit and alphabet code of the type in which each character comprises segments in selected ones of four stations arranged in a first aligned pair of upper and lower stations and a second adjacent aligned pair of upper and lower stations, each aligned pair of segments occurring in a pair of stations being substantially the same width or differing by at least a predetermined width, said method comprising:

simultaneously scanning the upper and lower stations using two sensing elements and generating two parallel outputs of gating signal trains according to the presence and width of segments in said upper and lower stations;

generating a frequency signal;

gating the frequency signal into a first channel under control of the output of the first sensing element to provide a train of pulses of the frequency signal, each pulse corresponding to the presence of a segment in the upper channel and having a width corresponding to the width of the segment;

gating the frequency signal into a second channel under control of the output of the second sensing element to provide a second train of pulses parallel to the first train, each pulse of the second train corresponding to the presence of a segment in the lower channel and having a width corresponding to the width of the segment in the second channel;

counting the cycles in a pulse of the first channel corresponding to an upper station segment to determine the width of the pulse and the corresponding segment;

counting the cycles in a pulse in the second channel corresponding to a lower station segment to determine the width of the pulse and the corresponding segment in the lower station;

suppressing the count of cycles in a pulse during the period of overlap of pulses in the first and second channel corresponding to the occurrence and overlap of segments in aligned upper and lower stations so that only the excess width of one pulse over another is counted;

generating a signal corresponding to one of the conditions of the occurrence and non-occurrence of simultaneous pulses in the first and second channels corresponding to the occurrence of non-occurrence of segments in both the upper and lower stations of a first pair of aligned stations;

generating a second signal indicating one of the two conditions of the upper segment being wider and not wider than any lower segment by a predetermined width;

generating a third signal indicating one of the two conditions of the lower segment being wider and not wider than any upper segment by a predetermined width;

temporarily storing said first, second and third signals for a first pair of pulses corresponding to a first pair of aligned stations;

generating said first, second and third signals for a second pair of aligned stations, said first and second pairs of stations corresponding to a character of the code;

and logically processing said first, second and third signals for the first and second pairs of stations to provide a binary output corresponding to the code character.

7. An automated method of reading an alphanumeric code of the type in which each digit comprises segments in selected ones of four stations, said stations arranged in a first pair of aligned upper and lower stations and a second adjacent pair of aligned upper and lower stations, each segment being one of two predetermined widths comprising:

simultaneously sensing the presence of segments in a first pair of stations and generating a first data signal indicating one of the conditions of the segments occurring and not occurring in both stations;

sensing the durations of segments in the upper and lower stations of the first pair and generating a second data signal indicating one of the conditions of the upper segment being and not being wider than the lower segment by a predetermined amount;

generating a third signal indicating one of the conditions of the lower segment being and not being wider than the upper segment by a predetermined amount;

temporarily storing said first, second and third data signals;

sensing a second pair of upper and lower stations and generating first, second and third data signals for said second pair of stations, said first and second pairs of stations corresponding to a character of the code;

logically processing said first, second and third data signals for each of the first and second pairs of stations to provide a binary coded decimal output corresponding to the code character, said step of logically processing said data signals comprising the following steps where C and D refer to the segments in upper and lower stations, respectively, subscript 1 denoting the first pair of segments and subscript 2 denoting the second pair of segments in a character, wherein CD and $\overline{CD}$ indicate, respectively, simultaneous occurrence and non-occurrence of segments in a pair of stations, and wherein and $^{-}$ indicate that the preceding segment is wider or not wider, said steps comprising:

generating a ones positions signal in a one, two, four, eight binary code under each of the following conditions:

$$C_1 \cdot C_1D_1$$
$$D_1 \cdot C_1D_1$$
$$C_1 \cdot C_2$$
$$C_1 \cdot D_2$$

generating a two's position signal for a one, two, four, eight binary code under each of the following conditions:

$$C_2$$
$$\overline{D_1} \cdot C_1D_1 \cdot C_1$$
$$\overline{D_1} \cdot C_1D_1 \cdot \overline{C_2D_2}$$

generating a four's positions signal for a one, two, four, eight binary code under each of the following conditions:

$$C_2D_2 \cdot C_1 \cdot \overline{D_2}$$
$$D_2 \cdot \overline{D_1} \cdot \overline{C_2D_2}$$

generating an eight's position signal for a one, two, four, eight binary code under each of the following conditions:

$$D_2 \cdot C_2D_2$$

and providing no output indicating a zero under the following conditions:

$$\overline{C_1} \cdot \overline{D_1} \cdot C_1D_1 \cdot C_2D_2 \cdot \overline{D_2}$$

* * * * *